United States Patent
Gil

(10) Patent No.: US 9,333,455 B2
(45) Date of Patent: May 10, 2016

(54) REDUCING TAR BALLS IN A GASIFICATION SYSTEM

(71) Applicant: GRUPO GUASCOR S.L., Olean, NY (US)

(72) Inventor: Roberto Gil, Vitoria (ES)

(73) Assignee: GRUPO GUASCOR, S. L., Arkaute, Alava (ES)

( * ) Notice: Subject to any disclaimer, the term of this patent is extended or adjusted under 35 U.S.C. 154(b) by 331 days.

(21) Appl. No.: 13/898,791

(22) Filed: May 21, 2013

(65) Prior Publication Data
US 2014/0060327 A1   Mar. 6, 2014

(30) Foreign Application Priority Data
May 24, 2012   (EP) .................................... 12382202

(51) Int. Cl.
| | | |
|---|---|---|
| B01D 53/14 | (2006.01) | |
| B01D 53/00 | (2006.01) | |
| B01D 53/96 | (2006.01) | |
| C10K 1/06 | (2006.01) | |
| C10K 1/04 | (2006.01) | |

(52) U.S. Cl.
CPC .......... *B01D 53/1493* (2013.01); *B01D 53/002* (2013.01); *B01D 53/96* (2013.01); *C10K 1/046* (2013.01); *C10K 1/06* (2013.01); *B01D 2257/702* (2013.01)

(58) Field of Classification Search
None
See application file for complete search history.

(56) References Cited

U.S. PATENT DOCUMENTS

| | | | | |
|---|---|---|---|---|
| 4,512,777 | A * | 4/1985 | Wild ......................... | C01B 3/50 48/210 |
| 6,312,503 | B1 * | 11/2001 | Fike ........................ | B01D 47/12 95/211 |
| 2010/0011958 | A1 * | 1/2010 | Cadours ............. | B01D 53/1425 95/187 |
| 2010/0051875 | A1 * | 3/2010 | Chornet .................. | C10K 3/023 252/373 |
| 2010/0132551 | A1 * | 6/2010 | Bouillon ............ | B01D 53/1425 95/179 |
| 2013/0303636 | A1 * | 11/2013 | Schmitt ..................... | C10C 1/00 518/702 |

* cited by examiner

*Primary Examiner* — Duane Smith
*Assistant Examiner* — Phillip Shao

(57) ABSTRACT

A system and method is provided for removing a condensate from a synthetic gas treatment system. The method includes feeding a first fluid stream into a bottom section of a scrubber chamber defined by a scrubber shell of a scrubber. The first fluid stream includes at least one condensable component. A second fluid stream is fed into a top section of the scrubber chamber, such that the second fluid stream flows in the scrubber chamber in a countercurrent flow direction to the first fluid stream. The second fluid stream contacts the first fluid stream causing the at least one condensable component to form the condensate, such that the condensate and the second fluid stream are collected in the bottom section of the scrubber chamber. The method further includes feeding a third fluid stream into the top section of the scrubbing chamber, such that the third fluid stream contacts the condensate and the second fluid stream and forms an emulsion. At least a portion of the emulsion including the condensate flows from the synthetic gas treatment system.

6 Claims, 2 Drawing Sheets

REDUCING TAR BALLS IN A GASIFICATION SYSTEM

BACKGROUND

This application claims priority to European Patent Application Serial No. 12382202.5, which was filed May 24, 2012. This priority application is hereby incorporated by reference in its entirety into the present application, to the extent that it is not inconsistent with the present application.

Synthetic gas, commonly referred to as syngas, is a gas mixture including varying amounts of carbon monoxide (CO) and hydrogen ($H_2$). In addition, synthetic gas may include other components, such as carbon dioxide ($CO_2$), methane ($CH_4$), nitrogen ($N_2$), and residual hydrocarbons. Synthetic gas is combustible and may be utilized, for example, as a fuel gas in gas and steam boiler plants, as an intermediate in generating synthetic natural gas, or for the production of other chemicals, such as methanol.

Synthetic gas may be produced, for example, by the reforming of natural gas or liquid hydrocarbons to produce hydrogen. Another method of producing synthetic gas is by the gasification of coal or biomass material streams. Such biomass material may include forest residues, agricultural residues, nuts, nut shells, wood chips, olive and grape mash, and urban biomass, such as municipal solid waste. The gasification of biomass may produce a crude synthetic gas including impurities, such as ammonia ($NH_3$), hydrogen sulfide ($H_2S$), carbonyl sulfide (COS), hydrogen chloride (HCl), volatile metals, tars, fines, and char. Such impurities may limit the usefulness of the synthetic gas as a fuel, intermediate, or component in another production process. For example, tars produced in the gasification of biomass may form high viscosity condensate, which when aggregated, may produce plugging or a blockage in production systems utilizing untreated or crude synthetic gas.

Accordingly, it is often desirable to clean or condition the crude synthetic gas to remove at least a portion of the impurities. For example, the impurities may be removed from the crude synthetic gas through the use of a cleaning system including a scrubber. In such a system, crude synthetic gas may be fed into the scrubber and contacted with water and cooled, whereby certain impurities, e.g., tars, condense to insoluble, highly viscous condensate. Typically, the condensate tends to aggregate during the cleaning and conditioning process, thereby plugging the cleaning system and requiring the shutdown of the cleaning system for removal of the blockage.

What is needed, then, is a method of preventing the aggregation of condensate in the cleaning system so that plugging of the cleaning system from an aggregation of condensate does not occur.

SUMMARY

Embodiments of the disclosure may provide a method for removing a condensate from a synthetic gas treatment system. The method includes feeding a first fluid stream into a bottom section of a scrubber chamber defined by a scrubber shell of a scrubber. The first fluid stream includes at least one condensable component. The method also includes feeding a second fluid stream into a top section of the scrubber chamber, such that the second fluid stream flows in the scrubber chamber in a countercurrent flow direction to the first fluid stream. The second fluid stream contacts the first fluid stream causing the at least one condensable component to form the condensate, such that the condensate and the second fluid stream are collected in the bottom section of the scrubber chamber. The method further includes feeding a third fluid stream into the top section of the scrubbing chamber, such that the third fluid stream contacts the condensate and the second fluid stream and forms an emulsion. The method further includes flowing at least a portion of the emulsion including the condensate from the synthetic gas treatment system.

Embodiments of the disclosure may further provide a method for preventing aggregation of a condensate in a synthetic gas treatment system. The method includes contacting the condensate disposed in a scrubber chamber defined by a scrubber shell of a scrubber with a solution including sodium silicate, potassium hydroxide, and sodium hypochlorite, such that an emulsion including the solution and the condensate is formed. The method also includes flowing at least the condensate dispersed in the emulsion out of the synthetic gas treatment system.

Embodiments of the disclosure may further provide a condensate removal system. The condensate removal system includes a scrubber having a scrubber shell defining a scrubber chamber, the scrubber shell including a scrubber shell top section defining a scrubber gas flow outlet and a scrubber shell bottom section defining a scrubber drain flow outlet. The scrubber also includes at least one primary nozzle disposed in a top section of the scrubber chamber, such that the primary nozzle is configured such that an opening defined in the primary nozzle faces a bottom section of the scrubber chamber. The scrubber also includes at least one secondary nozzle disposed in the top section of the scrubber chamber, such that the secondary nozzle is configured such that an opening defined in the secondary nozzle faces a drop eliminator disposed in the top section of the scrubber chamber. The system also includes a separator including a separator shell defining a separator chamber, the separator shell including a separator shell bottom section defining a separator fluid outlet, the separator being configured to separate a condensate flow stream including water and a condensate such that the condensate migrates toward a bottom section of the separator chamber and flows through the separator fluid outlet. The system further includes a feed tank defining a feed tank chamber and configured to be in fluid communication with the separator through manipulation of a feed tank valve, and further configured such that an emulsifier feed may be dissolved in the water fed from the separator in the feed tank chamber, the feed tank being further configured to be in fluid communication with the secondary nozzle opening.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
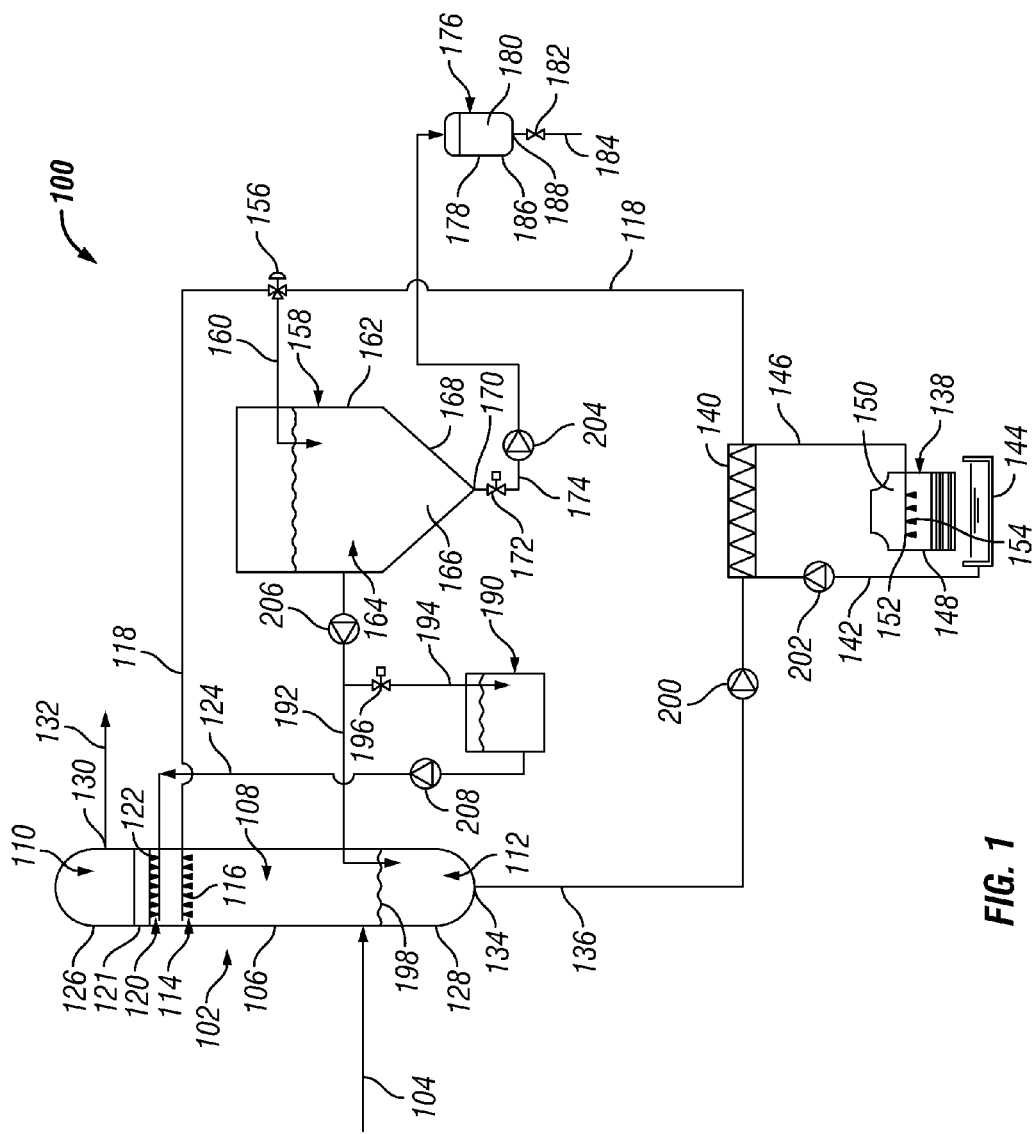
FIG. 1 illustrates a schematic of an exemplary condensate removal system, according to an embodiment.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates an exemplary condensate removal system configured to remove condensate from a flowing crude synthetic gas stream. The term "crude synthetic gas" as disclosed herein may be defined as a synthetic gas including one or more tars. The term "tar" may be defined as a component in the crude synthetic gas stream capable of being condensed in a gasification unit or in downstream processing steps or conversion devices. The term "condensate" may be defined to include at least one tar component that has condensed into liquid form.

As illustrated in FIG. 1, the condensate removal system 100 includes a scrubber 102 in fluid communication with a crude synthetic gas source (not shown) via line 104. In an exemplary embodiment, the crude synthetic gas source may be a gasification system including a gasification unit for processing gasification feed material. The gasification unit may be a fluidized-bed gasifier. In another embodiment, the gasification unit may be an entrained-flow gasifier. The crude synthetic gas source may be a tank or other collection vessel or, in some embodiments, may instead or additionally be a pipeline.

The gasification feed material may be biomass material or coal. In an exemplary embodiment, the gasification feed material is biomass material. The biomass material may be a homogeneous biomass material, such that the biomass material is formed from a single source. The biomass material may instead be a heterogeneous biomass material, such that the biomass material is formed from a plurality of sources. The biomass material may include, for example, forest residues, agricultural residues, nuts, nut shells, wood chips, olive and grape mash, and urban biomass, such as municipal solid waste.

In an exemplary embodiment, the crude synthetic gas stream includes at least one impurity, for example, tar. Further, the crude synthetic gas may include a plurality of impurities. Nonlimiting examples of such impurities include ammonia ($NH_3$), hydrogen sulfide ($H_2S$), carbonyl sulfide (COS), hydrogen chloride (HCl), volatile metals, tars, fines, char, and combinations thereof. In an embodiment in which the biomass material is wood chips, the impurities may include dust, tar and ammonia ($NH_3$).

In another embodiment, the crude synthetic gas stream may be fed to the scrubber 102 via line 104 from one or more cyclones (not shown) coupled in fluid communication to the gasification system. The crude synthetic gas stream may flow from the gasification unit through the one or more cyclones in which one or more impurities having a diameter greater than about ten microns, commonly referred to as char, may be removed.

The scrubber 102 in the exemplary embodiment illustrated in FIG. 1 may be a spray tower scrubber with or without internal packing. In another embodiment, the scrubber 102 may be a venturi scrubber. It will be appreciated by one of ordinary skill in the art that the scrubber 102 may be any scrubbing component capable of removing one or more tars from the crude synthetic gas stream within the spirit and scope of the present invention.

The scrubber 102 may include a cylindrical scrubber shell 106 defining a scrubber chamber 108 having a scrubber chamber top section 110 and a scrubber chamber bottom section 112. One or more primary nozzles 114, illustrated as a plurality of primary nozzles 114 in FIG. 1, may be disposed in the top section 110 of the scrubber chamber and oriented such that a nozzle opening 116 formed in at least one of the one or more primary nozzles faces the bottom section 112 of the scrubber chamber. One or more primary nozzles 114 may be in fluid communication with line 118.

The scrubber 102 further may include one or more secondary nozzles 120, illustrated as a plurality of secondary nozzles 120 in FIG. 1, disposed in the top section 110 of the scrubber chamber adjacent a drop eliminator 121 and oriented such that a nozzle opening 122 formed in at least one of the one or more secondary nozzles faces the drop eliminator 121 and top section 110 of the scrubber chamber. One or more secondary nozzles 120 may be in fluid communication with line 124. One of ordinary skill in the art will appreciate that the drop eliminator 121 may be any component capable of separating liquid from the synthetic gas flowing therethrough.

The cylindrical scrubber shell 106 may include a cylindrical scrubber shell top section 126 and a cylindrical scrubber shell bottom section 128. The cylindrical scrubber shell top section 126 may form a scrubber gas flow outlet 130 such that the top section 110 of the scrubber chamber is in fluid communication with line 132. The cylindrical scrubber shell bottom section 128 may form a scrubber drain flow outlet 134 such that the bottom section 112 of the scrubber chamber is in fluid communication with line 136.

The exemplary condensate removal system 100 shown in FIG. 1 may further include a cooling tower 138 and a heat exchanger 140 in fluid communication with the scrubber 102 via line 136. The heat exchanger 140 may be configured to receive a cooling fluid stream via line 142 from a cooling source 144 in fluid communication with the cooling tower 138. The cooling fluid stream may flow through the heat exchanger 140 and absorb heat from a condensate flow stream, fed from the scrubber via line 136, as the condensate flow stream flows through the heat exchanger. The cooling fluid stream may exit the heat exchanger 140 having an elevated temperature and may flow to the cooling tower 138 via line 146. The cooling tower 138 may include a cooling tower housing 148 defining a cooling tower chamber 150. One or more cooling tower nozzles 152, illustrated as a plurality of cooling tower nozzles 152, may be disposed in the cooling tower chamber 150 and may be in fluid communication with line 146. The cooling fluid stream having an elevated temperature may flow via line 146 through an opening 154 defined in at least one of the one or more cooling tower nozzles 152 into the cooling tower 138. The cooling fluid stream may be cooled in the cooling tower 138 and returned to cooling source 144. The heat exchanger 140 may further be in fluid communication with the scrubber 102 and the plurality of primary nozzles 114 via line 118 and a decanter inlet flow valve 156, discussed below.

As shown in FIG. 1, an exemplary condensate removal system 100 may include a separator component, illustrated as a decanter 158, in fluid communication with line 118 via line 160 and the decanter inlet flow valve 156. The separator component 158 may be configured to separate at least a portion of the condensate from a condensate flow stream. In another embodiment, the separation component includes a decanter centrifuge. It will be appreciated by one of ordinary skill in the art that the separation component may be any separation component capable of separating at least a portion of the condensate from the condensate flow stream within the spirit and scope of the present invention.

The decanter inlet flow valve 156 may be coupled in fluid communication to line 118 and 160 such that manipulation of the decanter inlet flow valve controls the flow of the condensate flow stream from the heat exchanger 140 to the decanter 158 via line 118 and line 160 or to the scrubber 102 via line 118. In an exemplary embodiment, the decanter inlet flow valve 156 may be oriented such that the decanter inlet flow valve, in an open position, provides for the heat exchanger 140 being in fluid communication with the scrubber 102 and the plurality of primary nozzles 114 via line 118. Conversely, the decanter inlet flow valve 156 in a closed position may provide for the heat exchanger 140 being in fluid communication with the decanter 158 via line 118 and line 160. Additionally, the decanter inlet flow valve 156 may be oriented to provide for the heat exchanger 140 being in fluid communication with the decanter 158 via line 118 and line 160 and to provide for the heat exchanger 140 being in fluid communication with the scrubber 102 and the plurality of primary nozzles 114 via line 118.

In an exemplary embodiment, the decanter flow inlet valve 156 may be a three-way ball valve. In another embodiment, the decanter inlet flow valve may be a set of three butterfly valves. In an exemplary embodiment, decanter inlet flow valve may be automatically controlled by a control system (not shown) responsive to at least one defined parameter. In some embodiments, the decanter inlet flow valve may instead, or in addition, be controlled manually by an operator. It will be appreciated by one of ordinary skill in the art that the decanter inlet flow valve may be any valve capable of controlling the flow direction of the condensate flow stream within the spirit and scope of the present invention.

As shown in FIG. 1, the decanter 158 includes a decanter shell 162 defining a decanter chamber 164 including a decanter chamber bottom section 166. The decanter shell 162 further may include a decanter shell bottom section 168 defining a decanter fluid outlet 170 such that the decanter chamber bottom section 166 is in fluid communication with a decanter outlet flow valve 172 via line 174.

As shown in FIG. 1, the condensate removal system 100 may further include a condensate tank 176 in fluid communication with the decanter 158 via the decanter outlet flow valve 172 and line 174. The condensate tank 176 may include a condensate tank shell 178 defining a condensate tank chamber 180 configured to collect condensate via line 174 when the decanter outlet flow valve 172 is oriented so that the decanter chamber 164 and line 174 are in fluid communication. In an exemplary embodiment, the decanter outlet flow valve 172, in an open position, may allow for condensate in the bottom section 166 of the decanter chamber to flow into the condensate tank 176.

In an exemplary embodiment, the decanter outlet flow valve 172 may be configured to actuate to the open position when the condensate level in the decanter has reached a defined parameter. In another embodiment, the decanter outlet flow valve may be configured to actuate to the open position at a timed interval. In some embodiments, the decanter outlet flow valve is configured to actuate to the open position when the liquid level in the decanter has reached a defined parameter, such as a liquid height level.

In an exemplary embodiment, the decanter outlet flow valve 172 may be a ball valve. In another embodiment, decanter outlet flow valve may be a butterfly valve. In an exemplary embodiment, decanter outlet flow valve may be automatically controlled by a control system (not shown) responsive to at least one defined parameter. In some embodiments, the decanter outlet flow valve may instead, or in addition, be controlled manually by an operator. It will be appreciated by one of ordinary skill in the art that the decanter outlet flow valve may be any valve capable of controlling the flow direction of the condensate within the spirit and scope of the present invention.

A condensate tank flow valve 182 may be coupled to line 184 as illustrated in FIG. 1. The condensate tank shell 178 may further include a condensate tank shell bottom section 186, such that the condensate tank shell bottom section defines a condensate tank fluid outlet 188 such that the condensate tank chamber 180 is in fluid communication with the condensate tank flow valve 182 via line 184. The condensate tank flow valve 182 may be manipulated to retain or remove condensate disposed in the condensate tank 176. The condensate tank flow valve 182 may be manipulated based on a defined parameter, such as condensate level in the condensate tank. Condensate may be passed via line 184 and the condensate tank flow valve 182 for further processing (not shown).

In an exemplary embodiment, the condensate tank flow valve 182 may be a ball valve. In another embodiment, the condensate tank flow valve may be a butterfly valve. In an exemplary embodiment, the condensate tank flow valve may be automatically controlled by a control system (not shown) responsive to at least one defined parameter. In some embodiments, the condensate tank flow valve may instead, or in addition, be controlled manually by an operator. It will be appreciated by one of ordinary skill in the art that the condensate tank flow valve may be any valve capable of controlling the flow direction of the condensate within the spirit and scope of the present invention.

As shown in FIG. 1, the condensate removal system 100 may further include a feed fluid tank 190 in fluid communication with the decanter 158 and the scrubber 102 via line 192, line 194, and the feed tank inlet flow valve 196. The feed tank inlet flow valve 196 may be configured to control the flow of fluid, e.g., water from the decanter 158 into the feed fluid tank 190 or into the scrubber 102. In an exemplary embodiment, the feed tank inlet flow valve 196, in an open position may provide for the feed fluid tank 190 being in fluid communication with the decanter 158 via line 196 and line 192. Alternately, in an exemplary embodiment, the feed tank inlet flow valve 196 in a closed position may provide for the decanter 158 being in fluid communication with the scrubber 102. As shown in FIG. 1, the feed fluid tank 190 may be further in fluid communication with the plurality of secondary nozzles 120 disposed in the top section 110 of the scrubber chamber in the scrubber 102 via line 124.

In an exemplary embodiment, the feed tank inlet flow valve 196 may be a three-way ball valve. In another embodiment, the feed tank inlet flow valve may be a set of three butterfly valves. In an exemplary embodiment, feed tank inlet flow valve may be automatically controlled by a control system (not shown) responsive to at least one defined parameter. In some embodiments, the feed tank inlet flow valve may instead, or in addition, be controlled manually by an operator. It will be appreciated by one of ordinary skill in the art that the feed tank inlet flow valve may be any valve capable of controlling the flow direction of the separated liquid flow from the separator within the spirit and scope of the present invention.

Turning now to the operation of the condensate removal system 100, an exemplary embodiment is provided using FIG. 1 as a reference. The condensate removal system 100 may have two modes of operation in an embodiment. The first mode of operation will now be presented.

In the first mode of operation, a crude synthetic gas stream may be provided via line 104 from the crude synthetic gas feed source (not shown). In an exemplary embodiment, the gas feed source may be a biomass gasification system. The crude synthetic gas stream may enter the bottom section 112 of the scrubber chamber of the scrubber 102 via line 104. In an exemplary embodiment, the flow rate of the crude synthetic gas stream entering the scrubber may range from about 1.5 m/s to about 3.5 m/s. In another embodiment, the flow rate of the crude synthetic gas stream entering the scrubber may range from about 2 m/s to about 3 m/s. In some embodiments, the flow rate of the crude synthetic gas stream entering the scrubber may range from about 2.5 m/s to about 3 m/s. It will be appreciated by one of ordinary skill in the art that the flow rate of the crude synthetic gas stream may depend at least in part on the impurities in the crude synthetic gas stream.

The pressure in the scrubber chamber may range from about 2 kPa to about 8 kPa in an exemplary embodiment. In another embodiment, the pressure in the scrubber chamber may range from about 4 kPa to about 7 kPa. In some embodiments, the pressure in the scrubber chamber may range from about 5 kPa to about 6 kPa. It will be appreciated by one of ordinary skill in the art that the pressure ranges in the scrubber chamber may depend at least in part on the flow rate of the crude synthetic gas and liquid flow therein.

The scrubbing of the crude synthetic gas stream may be effected at a gas entry temperature of from about 250° C. to about 750° C. and an exit temperature of from about 25° C. to about 35° C. in an exemplary embodiment. In another embodiment, scrubbing of the crude synthetic gas stream may be effected at a gas entry temperature of from about 350° C. to about 550° C. and an exit temperature of from about 25° C. to about 32° C. In some embodiments, scrubbing of the crude synthetic gas stream may be effected at a gas entry temperature of from about 350° C. to about 450° C. and an exit temperature of from about 28° C. to about 32° C. It will be appreciated by one of ordinary skill in the art that the entry and exit temperatures may depend at least in part on the temperature of the upstream crude synthetic gas stream and downstream treated synthetic gas stream, respectively.

As the crude synthetic gas stream enters the bottom section 112 of the scrubber chamber, the pressure differential in the scrubber chamber 108 forces the crude synthetic gas stream toward the top section 110 of the scrubber chamber. Water may be fed via line 118 through each opening 116 in the plurality of primary nozzles 114, whereby gravitational force and water pressure forces the water in the direction of the bottom section 112 of the scrubber chamber. Accordingly, the crude synthetic gas stream and the water may flow in a countercurrent flow direction. The pH of the water may be generally neutral, i.e., about 7; however, embodiments in which the water is greater or less than 7 are contemplated herein. The crude synthetic gas stream may be contacted by the water and cooled as it flows upward through the scrubber chamber 108 such that at least one tar in the crude synthetic gas stream condenses into highly viscous condensate. The condensate may fall to the bottom section 112 of the scrubber chamber into a pool 198 of collected water from at least the water flow through the primary nozzles above. The condensate is insoluble and disposed in the collected water pool 198 formed in the bottom section 112 of the scrubber chamber.

As the crude synthetic gas stream flows upward through the scrubber chamber 108 and the tar condenses and is separated from the crude synthetic gas stream, the remaining synthetic gas stream, or treated synthetic gas stream, may flow through the drop eliminator 121, such that any water remaining in the treated synthetic gas stream may be substantially removed from the treated synthetic gas stream, and the treated synthetic gas stream may further flow through the scrubber gas flow outlet 130 formed from the cylindrical scrubber shell top section 126 and into line 132 where the treated synthetic gas stream may be routed for further processing as shown in FIG. 1.

The collected water pool 198 and the insoluble condensate disposed therein may form the condensate flow stream in an exemplary embodiment. In some embodiments, the condensate flow stream may include emulsifier components, discussed below. The condensate flow stream may flow through the scrubber drain flow outlet 134 formed in the cylindrical scrubber shell bottom section 128 and into line 136 where the condensate flow stream may be pumped via a pump 200 into the heat exchanger 140. In addition, the heat exchanger 140 may receive the cooling fluid stream pumped via a pump 202 through line 142 from the cooling source 144 in fluid communication with the cooling tower 138. The cooling fluid stream may flow concurrently through the heat exchanger 140 and absorb heat from the condensate flow stream as the condensate flow stream flows through the heat exchanger. The cooling fluid stream may exit the heat exchanger 140 having an elevated temperature and may flow to the cooling tower 138 via line 146. The cooling tower 138 may include the cooling tower housing 148 defining the cooling tower chamber 150. The plurality of cooling tower nozzles 152 may be disposed in the cooling tower chamber 150 and may be in fluid communication with line 146. The cooling fluid stream having an elevated temperature may flow via line 146 through the opening 154 defined in each of the cooling tower nozzles 152 into the cooling tower 138 such that the cooling fluid stream is cooled and returned to the cooling source 144. In another embodiment, the cooling fluid stream may flow through the heat exchanger in a countercurrent flow direction of the condensate flow stream.

The condensate flow stream may return to the scrubber 102 via line 118 and the decanter inlet flow valve 156. The decanter inlet flow valve 156 may be actuated so that the condensate flow stream may be routed from the heat exchanger 140 to the scrubber 102 via line 118 without flow diversion to the decanter 158. The condensate flow stream may enter the scrubber chamber 108 via the opening 116 in one or more of the plurality of primary nozzles 114, such that the water in the condensate flow stream may contact the crude synthetic gas stream in the scrubber 102, thereby forming additional highly viscous condensate in the bottom section 112 of the scrubber chamber.

The first mode of operation may be a continuous process of operation during a continuous feed of crude synthetic gas stream. As the first mode of operation progresses, additional condensate may be formed in the condensate removal system. Typically, the condensate aggregates, thereby forming one or more large masses of condensate prone to forming blockages and plugging of the system. In an exemplary embodiment, a second mode of operation of the condensate removal system provides for removal of the one or more large masses of condensate.

In an exemplary embodiment of a second mode of operation, at least a portion of the condensate flow stream leaving the heat exchanger 140 via line 118 may be diverted to line 160 through actuation of the decanter inlet flow valve 156. In one embodiment, the decanter inlet flow valve 156 may be actuated in such a manner that prevents flow of the condensate flow stream from the heat exchanger 140 to the scrubber 102 via line 118 for a period of time or other defined parameter. In another embodiment, actuation of the decanter inlet flow valve 156 may reduce the flow of the condensate flow stream from the heat exchanger 140 to the scrubber 102 via line 118. In instances wherein the actuation reduces the flow of the condensate flow stream from the heat exchanger 140 to the scrubber 102 via line 118, but does not prevent the flow, the remaining portion of the condensate flow stream may be fed through the one or more openings 116 in the plurality of primary nozzles 114 in the scrubber chamber 108 via line 118. In an exemplary embodiment, the decanter inlet flow valve 156 may be actuated after a time interval or other defined parameter so that the flow from the heat exchanger 140 is no longer diverted to the decanter 158.

Further, the condensate flow stream diverted to the decanter 158 via line 160 may be fed into the decanter chamber 164 in which the water in the condensate flow stream is separated from the condensate through gravitational forces. Accordingly, the condensate separates from the water and settles in the bottom section 166 of the decanter chamber. The condensate may be removed via line 174 and the decanter outlet flow valve 172 and pumped to the condensate tank 176 via a pump 204. The decanter outlet flow valve 172 may be actuated such that the condensate is removed at a specified time interval or other defined parameter, such as condensate height level in the decanter. In another embodiment, the decanter outlet flow valve 172 may be actuated by a command from an operator monitoring the condensate removal system.

The condensate may enter the condensate tank chamber 180, of the condensate tank 176. The condensate tank shell bottom section 186 defines the condensate tank fluid outlet 188 such that the condensate tank chamber 180 may be in fluid communication with the condensate tank flow valve 182 via line 184. The condensate tank flow valve 182 may be manipulated to retain or remove condensate disposed in the condensate tank 176. The condensate tank flow valve 182 may be manipulated based on a defined parameter, such as the condensate level in the condensate tank 176. In an exemplary embodiment, the condensate may be passed via line 184 and the condensate tank flow valve 182 for further processing (not shown).

As shown in FIG. 1, the water separated from the condensate in the decanter 158 may be pumped via a pump 206 through line 192 to the scrubber 102 or the feed fluid tank 190 via line 194 and the feed tank inlet flow valve 196. In an exemplary embodiment of the second mode of operation, the feed tank inlet flow valve 196 may be actuated so that at least a portion of the water flow from the decanter 158 is diverted to the feed fluid tank 190 for a specified time interval or other defined parameter. The water may be contacted in the feed fluid tank 190 with one or more soluble components fed from a feed source (not shown). In an embodiment, the feed source may be a hopper. In another embodiment, the feed source may be a tank with a continuous dosage system. In an exemplary embodiment, the soluble components include sodium silicate ($Na_2SiO_3$), potassium hydroxide (KOH), and sodium hypochlorite (NaClO). In another embodiment, the soluble components may include sulfuric acid ($H_2SO_4$). The soluble components may vary depending on the impurity or impurities in the crude synthetic gas stream.

The solution, formed from the dissolved components, may be pumped via a pump 208 through line 124 into the scrubber chamber 108. Line 124 may be in fluid communication with the one or more openings 122 formed in the plurality of secondary nozzles 120. The solution may be fed through the secondary nozzle openings 122 and may contact the drop eliminator 121, thereby removing any impurities or other contaminants disposed therein. The solution may further contact at least a portion of the condensate disposed in the scrubber 102, such that the solution disperses the one or more large masses of condensate disposed in the collected water pool 198 in the scrubber. The solution is an emulsifier and allows for the formation of an emulsion when the solution is added to the scrubber. The formation of an emulsion may prevent the condensate from aggregating and forming large masses of condensate capable of creating blockages in or plugging of the condensate removal system.

In an exemplary embodiment of the second mode of operation, the feed tank inlet flow valve 196 may be actuated after a time interval or other defined parameter such that flow diverted to the feed fluid tank 190 may be prevented and the water flow from the decanter 158 may be fed into the bottom section 112 of the scrubber chamber.

In an exemplary embodiment, the primary mode of operation may be run continuously, whereas the second mode of operation may be run at defined intervals based on one or more parameters. Such parameters include, for example, system pressure, flow rate, system temperature, time, scrubber level, biomass composition, and crude synthetic gas stream composition.

Figure 2:
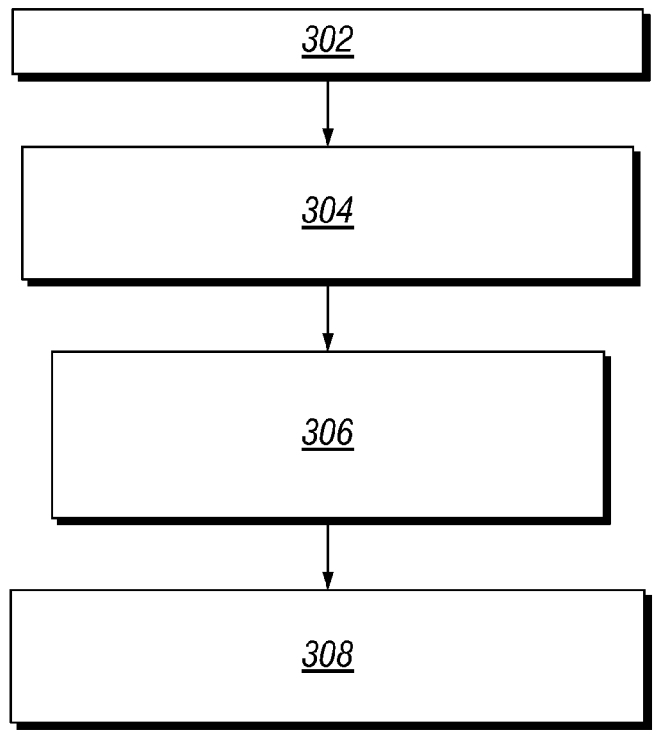
FIG. 2 is a flowchart of a method for removing condensate from a synthetic gas treatment system, according to an embodiment.

Turning now to FIG. 2, a flowchart of an exemplary embodiment of a method 300 for removing condensate from a synthetic gas treatment system is shown. The method 300 may include feeding a first fluid stream into a bottom section of a chamber defined by a scrubber shell of a scrubber, as at 302. The first fluid may include at least one condensable component, e.g., tar. In an embodiment, the first fluid may include synthetic gas.

Further, the method 300 may include feeding a second fluid stream into a top section of the scrubber chamber such that the second fluid stream may flow in the scrubber chamber in a countercurrent flow direction to the first fluid stream and may further contact the first fluid stream causing the at least one condensable component to form the condensate, as at 304. The condensate and the second fluid stream may be collected in a bottom section of the scrubber chamber. The second fluid may be water in an embodiment.

In an exemplary embodiment, the method 300 includes feeding a third fluid stream into the top section of the scrubbing chamber such that the third fluid stream may contact the condensate and the second fluid stream and form an emulsion, as at 306. In another embodiment, the third fluid stream may include sodium silicate, potassium hydroxide, and sodium hypochlorite. At least a portion of the emulsion may be flowed from the synthetic gas treatment system such that the condensate may be removed from the synthetic gas treatment system, as at 308.

Figure 3:
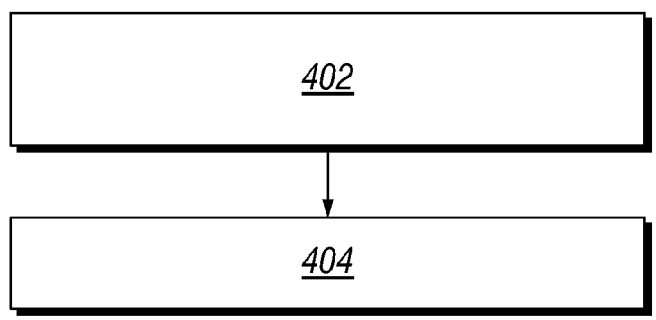
FIG. 3 is a flowchart of a method for preventing aggregation of condensate in a synthetic gas treatment system, according to an embodiment.

Looking now at FIG. 3, a flowchart of an exemplary embodiment of a method 400 for preventing aggregation of condensate in a synthetic gas treatment system is shown. The method 400 may include contacting the condensate disposed in a chamber defined by a scrubber shell of a scrubber with a solution including sodium silicate, potassium hydroxide, and sodium hypochlorite, such that an emulsion including the solution and the condensate is formed, as at 402. At least the condensate dispersed in the emulsion may be flowed out of the synthetic gas treatment system, as at 404.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A method for removing a condensate from a synthetic gas treatment system, comprising:

feeding a first fluid stream into a bottom section of a scrubber chamber defined by a scrubber shell of a scrubber, wherein the first fluid stream comprises at least one condensable component;

feeding a second fluid stream into a top section of the scrubber chamber, wherein the second fluid stream flows in the scrubber chamber in a countercurrent flow direction to the first fluid stream, wherein the second fluid stream contacts the first fluid stream causing the at least one condensable component to form the condensate, wherein the condensate and the second fluid stream are collected in the bottom section of the scrubber chamber;

feeding a third fluid stream into the top section of the scrubbing chamber, wherein the third fluid stream contacts the condensate and the second fluid stream and forms an emulsion; and flowing at least a portion of the emulsion including the condensate from the synthetic gas treatment system.

2. The method of claim 1, wherein the first fluid stream comprises synthetic gas.

3. The method of claim 1, wherein the second fluid stream comprises water.

4. The method of claim 1, wherein the third fluid stream comprises sodium silicate, potassium hydroxide, and sodium hypochlorite.

5. The method of claim 1, wherein the second fluid stream comprises water, and the method further comprises:

feeding a condensate flow stream comprising the condensate and water in the scrubber to a separator; and separating the condensate flow stream in the separator, whereby the water is fed to a feed tank and the condensate is fed to a collection tank.

6. The method of claim 5, further comprising feeding an emulsifier feed comprising sodium silicate, potassium hydroxide, and sodium hypochlorite to the feed tank, wherein the emulsifier feed is dissolved in the water forming the third fluid stream.

* * * * *